US006681222B2

United States Patent
Kabra et al.

(10) Patent No.: US 6,681,222 B2
(45) Date of Patent: Jan. 20, 2004

(54) UNIFIED DATABASE AND TEXT RETRIEVAL SYSTEM

(75) Inventors: Navin Kabra, Pune (IN); Raghu Ramakrishnan, Madison, WI (US); Uri Shaft, San Leandro, CA (US); Vuk Ercegovac, San Francisco, CA (US)

(73) Assignee: Quip Incorporated, Madison, WI (US)

( * ) Notice: Subject to any disclaimer, the term of this patent is extended or adjusted under 35 U.S.C. 154(b) by 226 days.

(21) Appl. No.: 09/906,502

(22) Filed: Jul. 16, 2001

(65) Prior Publication Data

US 2003/0014396 A1 Jan. 16, 2003

(51) Int. Cl.[7] .............................................. G06F 17/30
(52) U.S. Cl. ........................ 707/5; 707/2; 707/3; 707/4
(58) Field of Search ................................. 707/2, 3, 4, 5

(56) References Cited

U.S. PATENT DOCUMENTS

| 5,943,443 | A | * | 8/1999 | Itonori et al. ............... 382/225 |
| 6,038,668 | A | * | 3/2000 | Chipman et al. ............ 713/201 |
| 6,199,062 | B1 | * | 3/2001 | Byrne et al. ................... 707/3 |
| 6,292,894 | B1 | * | 9/2001 | Chipman et al. ............ 713/168 |
| 6,496,830 | B1 | * | 12/2002 | Jenkins, Jr. .................. 707/100 |
| 6,578,026 | B1 | * | 6/2003 | Cranston et al. ............... 707/2 |

* cited by examiner

*Primary Examiner*—Frantz Coby
(74) *Attorney, Agent, or Firm*—Quarles & Brady LLP

(57) ABSTRACT

A unified database/text retrieval system converts exact database type queries into text inclusion type queries suitable for text retrieval systems through the use of pseudo keywords. Boolean combination of the text inclusion type query elements may be readily manipulated for optimization and applied to a unified index for rapid search results. Absolute relevance values and relevance multiplier values may be added to the query elements to provide a relevance-based sorting not only of text but also of exact match type search results. Relevance values may be deduced automatically from a variety of sources.

47 Claims, 4 Drawing Sheets

UNIFIED DATABASE AND TEXT RETRIEVAL SYSTEM

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to computerized database systems and, in particular, to a database system that provides integrated text retrieval capability.

Conventional databases, including relational and object relational databases, usually consist of a number of tables. Each table consists of a number of tuples (rows) that share some common attribute (column). The value of an attribute is usually a simple data type like an integer, floating point number, date or string.

A query over such a database consists of finding all the tuples in one or more tables that exactly satisfy a given set of constraints represented by a Boolean combination of query elements. For example, a simple query might find all tuples that have attribute values that match (equal) a value of a query element. The search results can either be returned in random order or according to ascending or descending values of one or more attributes of the resulting tuples. An index using a B-tree or hash-type structure may be used to rapidly process queries without a need to review every tuple for each query.

Queries in such database systems can be considered "exact" in a sense that either a given tuple matches constraints of the query or does not. If a tuple matches the query, then the tuple is included in the search result. If the tuple does not match the query, then the tuple is not included in the search result.

In contrast to the above described database system, a text retrieval system consists of a collection of text documents. Each document is treated as a collection of keywords. A query over such a database consists of finding all the documents that "contain" one or more of a given set of keywords. The results are usually returned in the order of relevance of the document to the particular query. For example, all the documents may be ranked according to how closely they match the given set of keywords or how many times the keywords are found in the document. The results are usually returned in the order of relevance. Again, so that each document need not be reviewed for each query, a reverse index may be constructed that lists the keywords linked to all the documents that contain each keyword.

Queries in such text retrieval systems can be considered to be "approximate" in the sense that a document that does not contain some of the keywords in a query is not automatically discarded. Rather, it is given a low relevance. Documents with relevance above a certain threshold are returned by the system and those with lower relevance are dropped. Complex queries made up of Boolean combinations of different query elements having different keywords may also be implemented.

The different form of queries for database systems and text retrieval systems, as exact and approximate, have resulted in only limited attempts at combining these two types of systems. Some text retrieval systems, for example, allow the use of non-text attributes for limiting the search to particular libraries or to particular documents to which attributes have been associated. Also, some databases allow for keyword searches on text field attributes. Nevertheless, these systems are very rudimentary, maintaining each of the exact query element and approximate query elements separate with respect to optimization and with respect to relevance which applies only to text retrieval query elements.

A unified approach to querying a combined database and text retrieval system is needed, one that expands to concept of relevance to all search results and that provides for superior optimization opportunities.

SUMMARY OF THE INVENTION

The present invention provides a unified database/text retrieval system provides an evaluation system which handles "mixture queries" composed of both exact and approximate query elements under a uniform framework. The invention allows mixture queries to be processed by a single index and preserves the properties of associativity and commutivity allowing optimization of the query. The invention further allows relevance values to be attached to component search results from all query elements (exact or approximate) so that the search results may be ordered by relevance.

Specifically then, the present invention provides a unified database/text retrieval system having a logical data table of tuples having attributes where at least one attribute is a text document. A means is provided for receiving a query that is a Boolean combination of value-matching (exact) query elements for a non-text document attributes and keyword-inclusion (approximate) query elements for the text document attribute. A preprocessor converts the value-matching condition to a keyword-inclusion condition using a pseudo-keyword; and an index communicating with the preprocessor provides a reverse index of keywords and pseudo-keywords to tuples.

Thus it is one object of the invention to allow text retrieval and database queries to be processed with a single logical index. It is another object of the invention to provide for a simple conversion means by which value-matching query elements may be converted to keyword-inclusion query elements.

The preprocessor preserves the Boolean combination of value-matching query elements and keyword-inclusion query elements in the corresponding keyword-inclusion query elements after the conversion of the value-matching query elements.

It is thus another object of the invention to allow a combination of database and text retrieval query elements in a query to be manipulated under the rules of associativity and commutivity to allow optimization of the query.

The preprocessor may assign relevance values to tuples identified through the index from the converted, value-matching query elements.

Thus it is another object of the invention to expand the concept of relevance to exact query elements.

The relevance values assigned to tuples may be derived from: attribute values associated with value-matching query elements of the query, previous searches by a user generating the query; degree of consanguinity between the query entered by the user and related query elements automatically augmenting the query.

It is another objective of the invention to allow automatic relevance assignment based on a variety of different inputs.

The invention may include a means for assigning a relevance value to the component search results for both the query elements that are value-matching query elements and the query elements that are text-inclusion query elements. A combiner then combines the relevance of all component search results to provide relevance value to search results meeting the query.

It is thus another object of the invention to provide the ability to combine relevance values of component search results resulting from both value-matching query elements and text-inclusion query elements.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 1A:
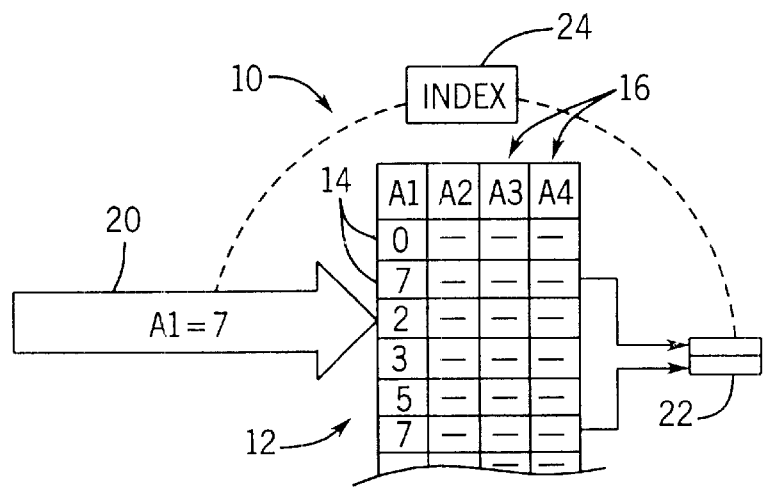
FIGS. 1a and 1b are simplified representations of a prior art database system and text retrieval system, respectively, showing use of indices based on underlying databases or text documents, the systems processing exact or approximate query elements, respectively, to produce a search result.

Referring to FIG. 1a, a prior art database system 10, includes a data table 12 including a number of tuples 14 (depicted as rows), having different attributes 16 arranged in columns labeled attribute A1 through A4. As is understood in the art, the data table 12 may be composed of a number of linked relational tables or other structures well known in the art.

An exact query element 20 (e.g., A1=7) may be applied to the data of the data table 12 to produce a search result 22 comprising tuples in which attribute 16 of A1 equals the value 7. The term exact query will henceforth be understood to include not only "equal" conditions but "less than" "greater than" conditions and Boolean combinations thereof. Similarly, value should be considered to include all data that may be mapped to ordinal values, including, for example, alphabetizable text strings.

Generally exact query element 20, as shown, may be formed into a more complex query (as will be described below) by combining it with other exact query elements 20 using Boolean operators such as AND, OR and NOT as is well known in the art.

An index 24 may be constructed of the data in data table 12 using hash coding or B-tree techniques to allow the search results 22 to be rapidly obtained without reference to each tuple 14 of the table 12. It is well known in such database systems 10 to optimize a query, for example, by simplifying the Boolean expression according to well-known algebraic manipulation techniques.

Figure 1B:
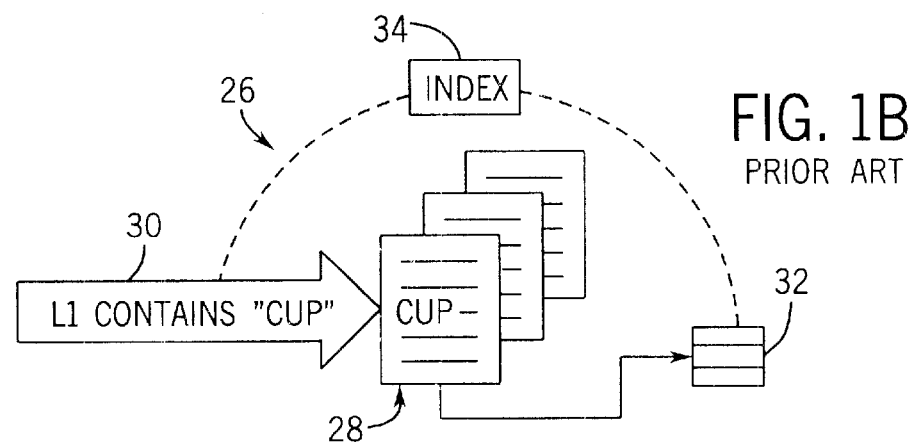

Referring now to FIG. 1b, a prior art text retrieval system 26 includes a set of text documents 28 which may be arranged in one or more libraries (not shown). An approximate query element 30, in this case, one requiring that all documents containing the word "cup" in library L1 be identified, may be applied to the text documents 28 to produce a search result 32 being titles of documents satisfying the approximate query element 30 and arranged according to relevance. A common relevance ordering technique considers how frequently the query element appears in the document in relationship to how common the keyword is in the library. This scheme is known as the term frequency—inverse document frequency formula (TF/IDF) and is well known in the art.

As before an index 34 may be constructed to provide rapid response to the approximate query element 30 without the need to do word searches in real time on each of the documents 28. The index may be a concordance listing keywords linked to their documents.

Figure 2:
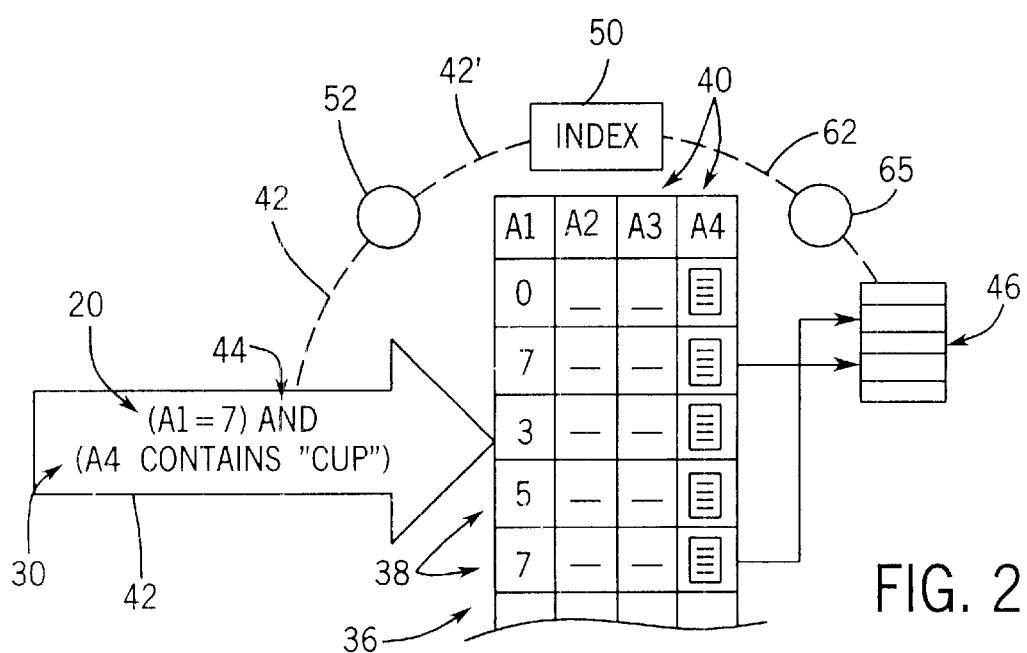
FIG. 2 is a figure similar to that of FIGS. 1a and 1b showing the combined database/text retrieval system of the present invention in which text documents are attributes of tuples in a database structure, and showing the receipt of a query having approximate and exact query elements joined by a Boolean operator such as may be received by a preprocessor and applied to a single index derived from the database to produce a search result.

Referring now to FIG. 2, the present invention provides a unified database 36 containing a set of tuples 38, again each represented as a row, linking a number of attributes 40, each represented as columns and listed as attributes A1 through A4. The attributes 40 may be simple data types, for example integers as shown in attribute A1, or may be text documents like those of a text retrieval system 26, as shown for attribute for A4.

A "mixed" query 42 may be applied to the unified database 36 as formed from a combination of exact "value-matching" query elements (e.g. A1=7) joined by Boolean operators 44 with approximate "keyword inclusion" query elements 30 (e.g. A4 contains "cup"), to yield search results 46 being a list of documents ordered according to relevance in much the same manner as the search results 32 of FIG. 1b. Again, an index 50 may be created to produce search results without direct review of each tuple 38 for each query 42.

Figure 3:
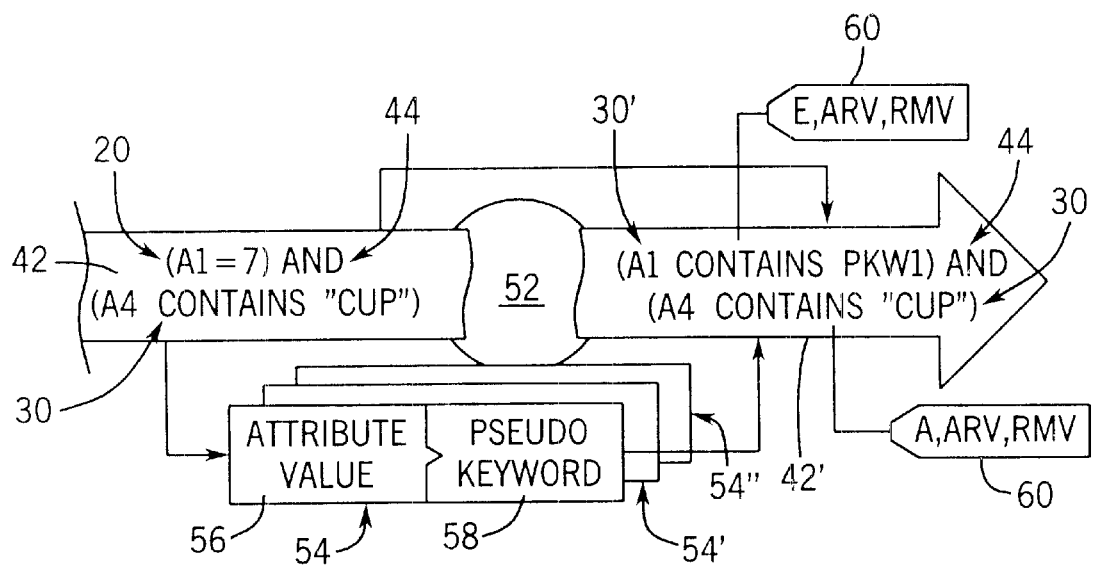
FIG. 3 is a graphical flow representation of the preprocessor of FIG. 2 showing receipt of approximate and exact query elements as may be converted to a Boolean combination of approximate query elements through the use of pseudo-keywords and which may be associated absolute relevance values and relevance multiplier values per the present invention.

Referring now to FIGS. 2 and 3, prior to the query 42 being received by the index 50 it passes through a preprocessor 52 which takes exact query elements 20 and converts them to approximate query element 30' through the use of one or more mapping tables 54 linking attributes (e.g., A1) and values 56 (e.g., 7) to pseudo keywords 58 such that the exact query element 20 of "A=7" becomes the approximate query element 30' of "A1 contains 'PKW1'" where PKW1 is representation of a pseudo keyword which may be an arbitrary combination of alphanumeric symbols.

The mapping provided by mapping table 54 sets aside a fixed number of pseudo keywords depending on the approximate range of the attribute values. A different mapping table 54 may be used for each attribute as indicated by mapping tables 54' and 54" so as to accommodate different value ranges for the different attributes 40. For example, 100,000 pseudo keywords may be set aside for a given attribute. Each attribute value may be mapped to a distinct pseudo keyword value on a one-to-one basis or, for attributes that have extremely large ranges of values, a hashing scheme may be used. Collisions in the case of the hashing scheme (two attribute values mapping to the same pseudo-keyword) may be minimized by the use of a sophisticated hash algorithm. However, some collision may be accommodated by the use of post-processing of the identified tuples to eliminate false positives.

The converted approximate query element 30' is combined with the approximate query element 30 to become a modified query 42'. The same Boolean operators 44 which joined the query elements 20 and 30 in the query 42 joins the modified approximate query elements 30' and 30 in the modified query 42'. The preprocessor 52 may include an optimizer for manipulating the resultant Boolean combinations of approximate query elements 30 and 30' to simplify the same.

The preprocessor 52 also attaches a tag 60 to each of the approximate query elements 30' and 30. This tag 60 indicates whether the underlying query element 20 or 30 (before modification) was an exact query element 20, indicated in the tag 60 by the letter E, or approximate query element 30, indicated in the tag 60 by the letter A. The tag 60 also provides a space for an absolute relevance value (ARV) and relevance multiplier value (RMV) as will be described below. Default values for the ARV and RMV are the value one, however the ARV and RMV are variables that may accept any value within a predefined range. The ARV and RMV values can be selected by the user of the unified database 36 as part of the query 42 or may be automatically generated from the context of the query as will be described further below.

The index 50 receiving the modified query 42' produces a set of tuples 38 associated with each approximate query element 30 or 30', the sets being termed "component search results" 63, The ARV and RMV will affect a relevance value assigned to these component search results whose combination via combiner 65 provides the search results 46. The search results take a relevance value deduced from the component search results and thus may be sorted by relevance. In this way, is should be noted, both exact and approximate query elements may contribute to the relevance of the search results.

Figure 4:
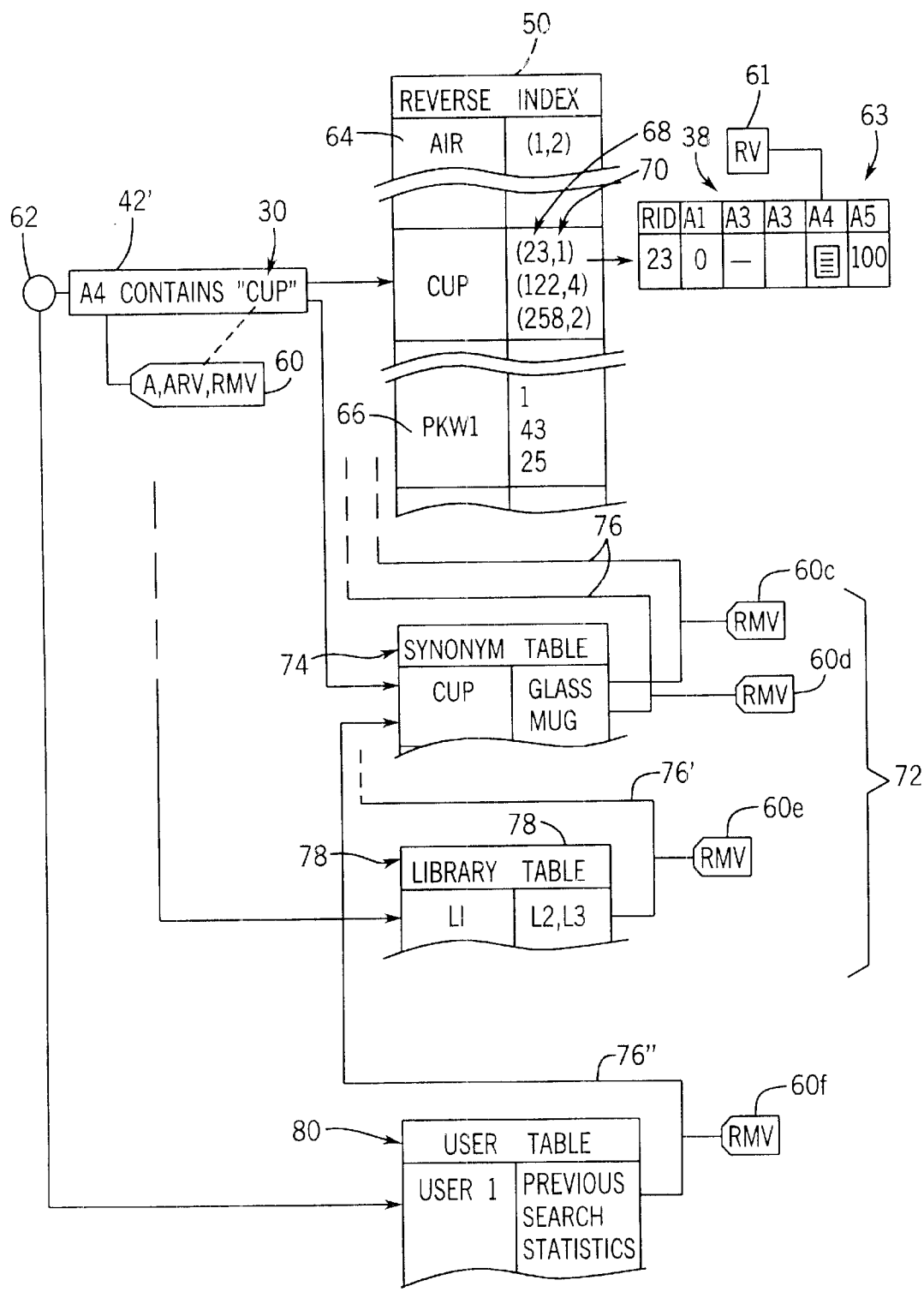
FIG. 4 is a flow chart showing the application of approximate query elements, such as may be produced by the preprocessor to the index of FIG. 2, to the index both directly and through query augmentation tables, and further showing the association of a relevance multiplier value or absolute relevance value with the component search results.

Referring now to FIG. 4, query 42' will in the first instance be applied directly to the index 50. At the index 50, the keywords of the approximate query elements 30 will be matched to keywords 64 and pseudo keywords 66 of the index 50 as linked to record identification numbers (RID) 68 uniquely identifying one tuple 38 of the unified database 36. The index 50 also links keywords 64 and pseudo keywords 66 to an incidence number 70 indicating the number of times the keywords 64 or pseudo keywords 66 of the first column of the index 50 is found in the document of the identified tuple 38. This index 50 is analogous to the standard reverse index used in prior art text retrieval system 26 except for the inclusion of the pseudo keywords 66.

As shown in FIG. 4, one tuple 38 may be part of a component search result 63 and includes a RID value of 23 as well as a set of linked attributes A1–A5 as stored in the unified database 36. Some of the attributes are simple data values and at least one (A4) is a text document. The attribute A5 may be automatically generated and added to the tuples 38 of the unified database 36 indicating the relative popularity of the tuple 38 (measured by the number of times it forms a component search result 63 to a query 42').

The index 50 may be generated and updated periodically at convenient intervals. As new documents are added to the unified database 36, additional ordered pairs representing the keywords of these documents, and the pseudo-keywords of the attributes of their associated tuples maybe added to the index 50 according to techniques well known in the art.

As mentioned, the result of application of the query 42' to the index 50 is a production of a set of tuples 38 (only one shown) corresponding to each approximate query element 30, each set of tuples 38 being a component search result 63. Relevance values 61 may be automatically assigned to the tuples 38 forming a component search result associated with a given approximate query element 30 or 30' according to the following system.

If the tuple 38 was produced as a result of an approximate query element 30 that was marked by tag 60 as approximate (A), then a conventional relevance algorithm, such as TF/IDF well known in text retrieval art, may be used to assign relevance value 61 to the tuple 38. The TF/IDF algorithm derived relevance for the tuple, on a tuple by tuple basis, from the incidence number 70. Alternatively, the relevance value 61 may be taken from a specific attribute value such as attribute A5 related to how frequently the tuple 38 is identified in searches or how the document of the tuple 38 is ranked by users, or the source of the document, or the like.

In all cases, the relevance value 61 is multiplied by the RMV associated with the approximate query element 30. If the approximate query element 30 is approximate and there is an ARV assigned to the approximate query element 30 not equal to one, the ARV as multiplied by the RMV becomes the relevance of the tuple 38.

If the tuple 38 was produced as a result of an approximate query element 30' that was marked by tag 60 as exact (E), then the relevance value is the ARV (even if the ARV is one) as multiplied by the RMV. The value of the ARV may be assigned by the user producing the query or may be automatically generated by any of the methods described above or henceforth.

The tuples of the ultimate search results 46 are returned ordered by the relevance value associated with each tuple as computed from the tuples 38 of the component search results. Tuples having a high relevance value are returned first, and those with a low relevance value are returned later, or are entirely dropped from the results. By changing the way in which relevance of a tuple is calculated, the set of tuples in the results of a query, and the order in which they are returned can be modified. This allows for a method by which the search results may be tuned by a user of this system.

One way to tune the search is by manually assigning the RMV associated with an approximate query element 30. Consider for example a query: A1 contains 'computer' OR A2 contains 'computer'. Let "A1" refer to a "header" text document associated with a "body" text document, and let "A2" refer to the "body" text document. Then the above query finds all tuples 38 which contain the word 'computer' in either the header or the body. The "relevance" each tuple is computed based on the number of occurrences of the keyword "computer" irrespective of whether it appears in the header or the body. To tune the search, a user may assign an RMV of 5 with the query element "A1 contains computer" and an RMV of 1 with the query element "A2 contains computer". In this case, the relevance of all tuples that contain the word computer in the header field will become five times higher than the relevance of the tuples containing the number of occurrences of the word computer in the body field.

Another way to tune the search is by getting the system to automatically compute the ARV associated with a query element. Referring still to FIG. 4, the invention allows the ARV and RMV for the approximate query element 30 or 30' to be automatically set, particularly for the case of approximate query elements 30' that derived from an exact query element 20. For example, a mapping may be done from a particular attribute value of a tuple 38 of the component search result 63, to an ARV value for all tuples 38 being part of a component search result 63 for the approximate query element 30. Such a system is appropriate, for example, for an attribute value that indicates the quality of the tuple 38 in some aspect, say that the author of the document associated with the tuple 38 is an expert.

Thus consider the example query: A1 contains "computer" and A3=1. Assume that "A3=1" is true only for those tuples having a text document whose author is an expert. Further assume that the user has specified that a reasonable value for the ARV of the exact query element "A3=1" should be automatically computed by the system. The relevance value associated with the approximate query element: A1 contains "computer" will be calculated by the system using the TF/IDF scheme. Assume for this example that this value comes out to be between 50 and 100 for various tuples. This relevance value will be added to the ARV automatically determined by the system for the query element "A3=1".

Now consider the following examples: if the ARV is computed by the system for the query element "A3=1" is 1 then this will have a negligible effect on the query results. This is because the relevance value for "A3=1" computed as 1 is much smaller than the relevance values contributed by the other query element. On the other hand, if the ARV for the query element "A3=1" is computed to be a large value like 500, then the relevance value contributed by the "A1 contains computer" query element becomes negligible. In this case, tuples authored by experts will show up high in the result list whether or not they are very relevant based on the result of the query.

To counter this problem, the system uses the following algorithm to determine a reasonable relevance value to be used as the ARV when automatically computing ARV values for exact query elements. To do this the system considers an imaginary tuple that contains all the keywords and pseudo keywords specified in the query. It assumes that this imaginary tuple contains each keyword exactly once. Based on this, the system computes the relevance values of this tuple with respect to all the other query elements in the query. The total relevance value associated with this imaginary tuple is used as the automatically computed ARV for the exact query element. This ensures that the ARV computed for the exact query element is a reasonable value when compared to the rest of the query. Thus, the ARV of the exact query element is high enough that it makes a significant difference to the relevance value associated with tuples that match the "A3=1" constraint. At the same time it is low enough that a tuple that is a really good match to the rest of the query (i.e. it contains a many of the other keywords a large number of times) can still get ranked high.

The effect of the automatically computed ARV can be further increased by assigning a high RMV with this query element, or decreased to some extent by using a low RMV (less than 1).

Although we have described one way of automatically computing the ARV for a query element, this does not exclude other methods of computing the ARV. Specifically, in addition to the above method, the ARV can be directly assigned by the user, or it can be based on the contents of other fields of a tuple (for example, the number of times the tuple was accessed recently, or the popularity of the tuple).

In the former case, the user can be presented with, for example, graphic controls such as one or more knobs that may be manipulated to set ARV values and RMV values directly for each particular query element. This may be part of a general query input screen in which query terms may be entered. More generally, the user may control a set of advanced search parameters fine tuning the query elements. These search parameters may implement absolute filters eliminating certain documents altogether, or weightings that produce the best matching documents by some additional parameter, such as document source or documents with the highest quality of match considering the query terms. Importantly, by exposing the ARV and RMV values the invention may allow the user, after seeing and appraising the results of the search, to quickly tune the search through interaction with these controls.

Often the query 42 will be augmented through additional query elements generated by augmenting tables 72. For example, a synonym table 74 may be used to expand the particular keyword or pseudo keyword to its synonyms. In this case a simple query of "L1 contains 'cup'" may be expanded to additional queries 76 for "L1 contains 'glass'" and "L1 contains 'mug'" Each of these additional queries 76 may be given a relevance multiplier value indicated by tags 60c and 60d reflecting the fact that they are removed in consanguinity from the original query element: "cup" and thus may have somewhat lower relevance.

Similarly, in the case where the queries 42' are directed to particular libraries (not shown), the particular library L1 in which the approximate query element 30 is directed, may be expanded through the library table 78 to produce additional query 76' associated with relevance multiplier value of tag 60e decreasing the relevance somewhat of the tuples that will be obtained from this particular query element. Note that the expansion of attribute values to other relevant attribute values can also be accomplished by the synonym table 74 which may include synonyms for pseudo-keywords. In this way a library-type partitioning may be realized through one of the attributes and the library table 78 implemented through the synonym table 74.

Similarly, the particular user 62 generating the query 42 or 42' may be used as an index to a user table 80 either generating additional queries 76" having corresponding relevance multiplier values per tag 60f or may be used to assign relevance values per tag 60b to the tuples produced depending on the data produced by the tuples.

Thus the present invention not only allows for the assignments of relevance values 61 to absolute or exact query elements 20 and 30, such as allows them to be integrated into a relevant sorting system for the search result 46, but also provides considerable flexibility in weighting and assigning relevance values 61 even to conventional text based searches.

The tuples 38 of the component search results 63 produced by applying each approximate query element 30 and 30' to the index 50 will thus each have a relevance value 61, which will be either a relevance value 61 calculated from the tuple 38 using the TFI/DF or similar formula, or a relevance value derived from the approximate query element 30 or 30' using ARV or RMV.

Figure 5:
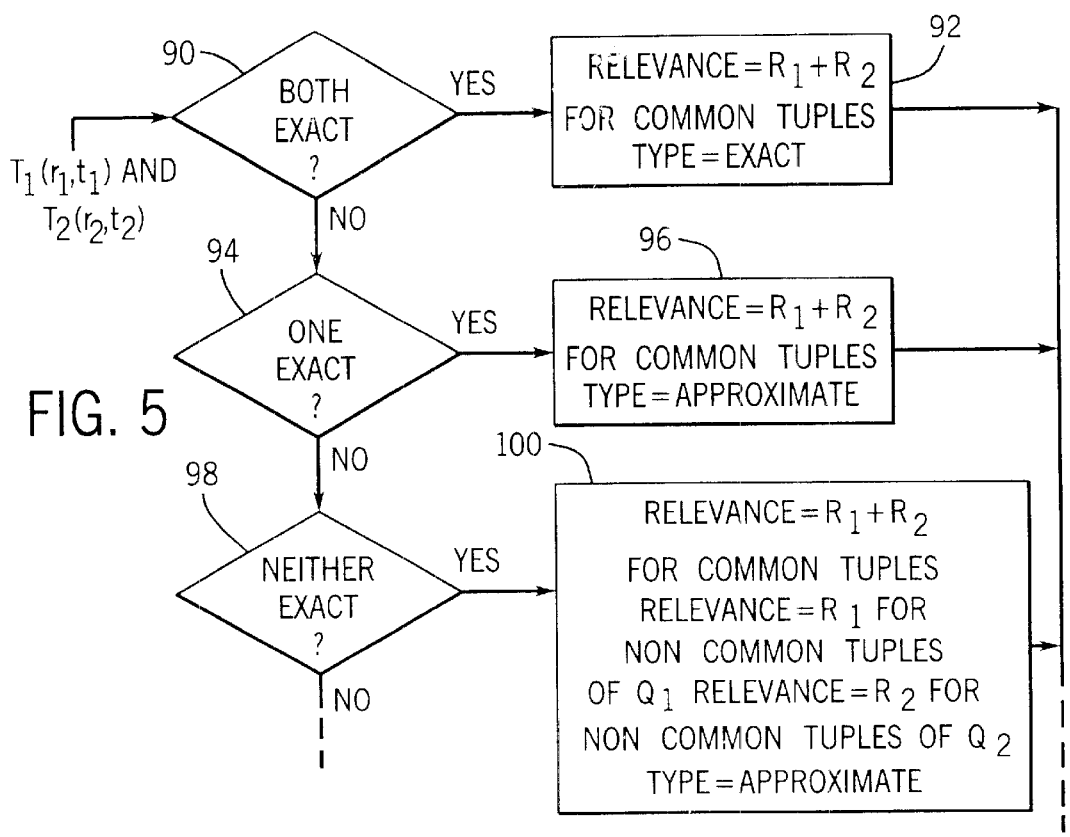
FIG. 5 is a flow chart showing the rules for deducing relevance and type (exact or approximate) from a simple Boolean AND combination of two queries.

Referring now to FIGS. 2 and 5, each component search result 63 collected from each approximate query element 30 and 30' is then combined by the combiner 65 according to the Boolean operators. So, for example, a first query may produce tuples 38 of a component search result 63 designated tuple set $T_i(r_i, t_i)$ where r is the relevance value 61 of the tuple 38 and t is its types as either exact or approximate. When two tuple sets $T_1 (r_1, t_1)$ and $T_2 (r_2, t_2)$ are combined according to their Boolean operators, the results will depend on their types.

Thus, for the Boolean AND combination at decision block 90, if the type of both tuple sets $T_1 (r_1, t_1)$ and $T_2 (r_2, t_2)$ is exact, meaning they came from exact query element 20, then at process box 92 the relevance of the common tuples (those which have identical RID's from $T_1 (r_1, t_1)$ and $T_2 (r_2, t_2)$) are passed to the search result 46 with a relevance equaled to $r_1$ plus $r_2$. These common tuples are given a type of exact as will be necessary for subsequent Boolean combinations, if any.

Alternatively, at process block 94, if only one of the modes of the tuple sets $T_1 (r_1, t_1)$ and $T_2 (r_2, t_2)$ being combined is exact, then at process block 96, the relevance is again the sum of the relevance values of the common tuples and the unmatched tuples are discarded. The tuples that are not discarded are given a type of approximate and forwarded to the search results 46 or for the next Boolean combination.

If at decision block 98, neither of the tuple sets $T_1 (r_1, t_1)$ and $T_2 (r_2, t_2)$ has a type of exact, then both the tuples that are common to both tuple sets and not common to both tuple sets are passed to the search result 46 or to the next Boolean combination, as indicated by process block 100. For common tuples, the relevance is $r_1$ plus $r_2$. For non-common tuples, the relevance is that of the underlying approximate query element 30 or 30' which produced it. The types of these tuples are all approximate.

Figure 6:
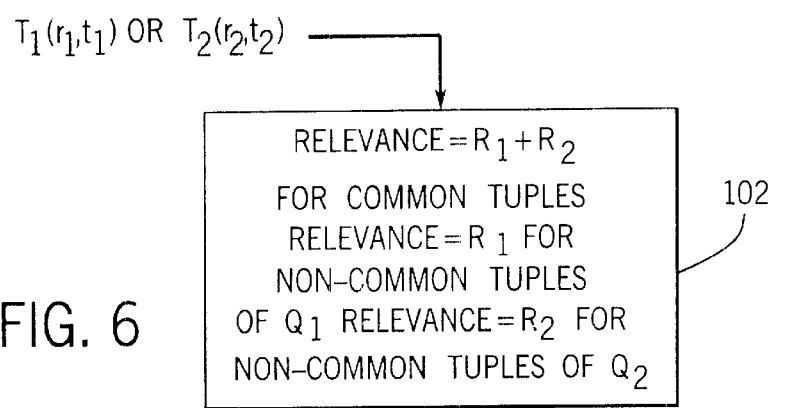
FIG. 6 is a figure similar to that of FIG. 5 showing the rules for deducing relevance and type for a Boolean OR combination of two query elements.
Figure 6:
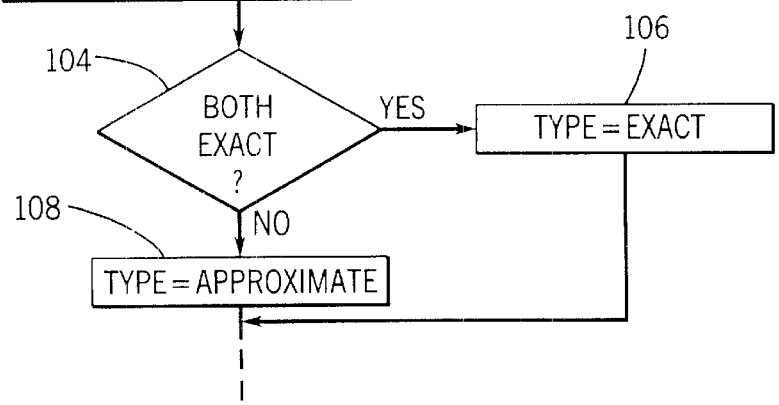

Referring now to FIG. 6, for a combination of two tuple sets $T_1 (r_1, t_1)$ and $T_2 (r_2, t_2)$ using the Boolean OR operator at process block 102, the relevance for common tuples becomes $r_1$ plus $r_2$ and for tuples that are found only in one tuple set, the relevance is the relevance of the underlying approximate query element 30 or 30'. At process block 104 if both of the tuple sets $T_1 (r_1, t_1)$ and $T_2 (r_2, t_2)$ derive from exact query elements 20, then the type is exact as indicated by process block 106. Otherwise, at process block 108 the type is approximate and the tuples thus marked are forwarded to the search result 46 or the next Boolean combination. In this way, relevance values may be combined across exact and inexact query elements.

Figure 7:
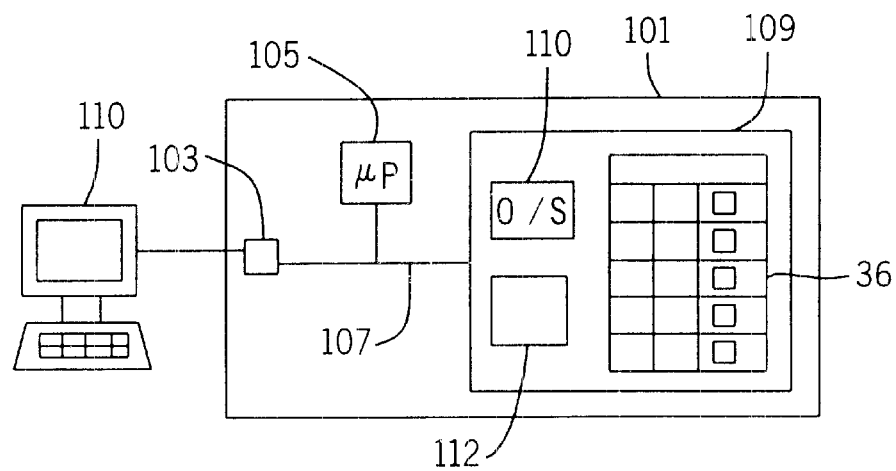
FIG. 7 is a block diagram of a computer system suitable for us with the present invention.

Referring now to FIG. 7, the present invention may be implemented on a computer 101 having a communication port 103 attached to a terminal 110 of conventional design for entering data or queries. The computer includes a processor 105 communicating on an internal bus 107 with a memory system 109, such as may include both random access memory and non-volatile mass storage devices such as magnetic disk and optical disk storage. The memory includes an operating system 110 executing a program 112 implementing the rules of FIGS. 5 and 6 and the preprocessor and other elements of FIGS. 3 and 4. The memory also includes the unified database 36 as has been described above.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A unified database/text retrieval system comprising:
   a logical data table of tuples having attributes where at least one attribute is a text document;
   a means for receiving a query being a Boolean combination of value-matching query elements for a non-text document attributes and keyword-inclusion query elements for the text document attribute;
   a preprocessor converting the value-matching condition to a keyword-inclusion condition using a pseudo-keyword; and
   an index communicating with the preprocessor providing a reverse index of keywords and pseudo-keywords to tuples;
   whereby combined text retrieval and database queries may be processed with a single logical index.

2. The unified database/text retrieval system of claim 1 wherein the preprocessor preserves the Boolean combination of value-matching query elements and keyword-inclusion query elements in the corresponding keyword-inclusion query elements after the conversion of the value-matching query elements.

3. The unified database/text retrieval system of claim 1 wherein the preprocessor assigns relevance values to tuples identified through the index using the converted value-matching query elements as index inputs;
   whereby a relevance sorting of the results of a query including both value-matching query elements and text-inclusion query elements may be performed.

4. The unified database/text retrieval system of claim 3 wherein the relevance values are derived from values of the at least one attribute of the tuples identified through the index.

5. The unified database/text retrieval system of claim 4 wherein the attribute is selected from the group consisting of the number of times the tuple was accessed, a rating of the text document of the tuple by users, and the source of the text document of the tuple.

6. The unified database/text retrieval system of claim 3 wherein the relevance values are variables accepting a value from a predetermined range of values.

7. The unified database/text retrieval system of claim 1 wherein the preprocessor assigns relevance values to tuples identified through the index from a query, where the relevance values are derived from the set of arguments consisting of: attribute values associated with value-matching query elements of the search, previous searches by a user generating the query; degree of consanguinity between the query entered by the user and related query elements automatically augmenting the query; a user entered value; and a total relevance of the query based on a standardized tuple.

8. The unified database/text retrieval system of claim 1 wherein the preprocessor assigns relevance values to at least some tuples identified through the index by means of an absolute relevance value associated with the converted value-matching condition.

9. The unified database/text retrieval system of claim 8 wherein the absolute relevance value contributes to the relevance of the tuples identified by the converted value-matching query elements by adding to the relevance value of common tuples identified by other query elements.

10. The unified database/text retrieval system of claim 1 wherein the preprocessor assigns a relevance multiplier to at least some query elements that contributes to the relevance of the tuples identified using the index with that query by multiplying the relevance of the identified tuples by the relevance multiplier.

11. A unified database/text retrieval system comprising:

a logical data table of tuples having attributes where at least one attribute is a text document;

a means for receiving a query being a Boolean combination of elements including at least one value-matching query elements for a non-text document attributes and at least one keyword-inclusion query element for the text document attribute;

a search means for providing component search results responsive to each query element of the query;

a means for assigning a relevance value to the component search results for both the query elements that are value-matching query elements and the query elements that are text-inclusion query elements;

a combiner for combining the relevance of all component search results to provide relevance value to search results meeting the query;

whereby search results may be sorted by relevance value.

12. The unified database/text retrieval system of claim 11 wherein the relevance values are derived from values of the at least one attribute of the tuples identified through the search means.

13. The unified database/text retrieval system of claim 12 wherein the attribute is selected from the group consisting of the number of times the tuple was accessed, a rating of the text document of the tuple by users, and the source of the text document of the tuple.

14. The unified database/text retrieval system of claim 11 wherein the relevance values are variables accepting a value from a predetermined range of values.

15. The unified database/text retrieval system of claim 11 wherein the means for assigning a relevance value to the component search results assigns an absolute relevance value to all tuples associated with the query element.

16. The combined database/text retrieval system of claim 15 wherein the means for assigning a relevance value to the component search results is a relevance multiplier associated with the query element.

17. The combined database/text retrieval system of claim 16 wherein the relevance multipliers are derived from the set of arguments consisting of: attribute values associated with value-matching query elements, previous searches by a user generating a current search; degree of consanguinity between the query entered by the user and related query elements automatically augmenting the query; a user entered value; and a total relevance of the query based on a standardized tuple.

18. A combined database/text retrieval system comprising:

a logical data table of tuples having attributes where at least one attribute is a text document;

a means for receiving a query being a Boolean combination of elements including at least one value-matching query element for a non-text document attribute and at least one keyword-inclusion query element for the text document attribute;

a means for converting the elements of value-matching query elements to elements of keyword-inclusion query elements while preserving associative and commutative properties to the Boolean combination; and a search means for providing component search results responsive to the converted Boolean combination;

whereby queries being a combination of text retrieval type elements and data table type elements may be optimized prior to searching.

19. The combined database/text retrieval system of claim 18 including further an optimizer for manipulating the Boolean combination after the conversion of elements to optimize the search.

20. The combined database/text retrieval system of claim 18 wherein the search means includes a preprocessor converting the value-matching condition to a keyword-inclusion condition using a pseudo-keyword; and an index communicating with the preprocessor providing a reverse index of keywords and pseudo-keywords to tuples.

21. The combined database/text retrieval system of claim 20 wherein the preprocessor assigns relevance values to tuples identified through the index using the converted value-matching query elements as index inputs; and wherein the relevance values are derived from the set of arguments consisting of: attribute values associated with value-matching query elements, previous searches by a user generating a current search; degree of consanguinity between the query entered by the user and related query elements automatically augmenting the query; a user entered value; and a total relevance of the query based on a standardized tuple.

22. The combined database/text retrieval system of claim 20 wherein the preprocessor assigns relevance values to tuples identified through the index using the converted value-matching query elements as index inputs and wherein the relevance values are derived from values of the at least one attribute of the tuples identified through the index.

23. The unified database/text retrieval system of claim 22 wherein the attribute is selected from the group consisting of the number of times the tuple was accessed, a rating of the text document of the tuple by users, and the source of the text document of the tuple.

24. A method of searching a logical data table of tuples having attributes where at least one attribute is a text document comprising the steps of:

(a) receiving a query being a Boolean combination of value-matching query elements for a non-text document attributes and keyword-inclusion query elements for the text document attribute;

(b) converting the value-matching condition to a keyword-inclusion condition using a pseudo-keyword; and (c) identifying tuples relevant to the query using a reverse index of keywords and pseudo-keywords to tuples.

25. The method of claim 24 wherein the Boolean combination of value-matching query elements and keyword-inclusion query elements in the corresponding keyword-inclusion query elements is preserved after the conversion of the value-matching query elements.

26. The method of claim 24 including the step of assigning relevance values to tuples identified through the index.

27. The method of claim 24 wherein the relevance values are derived from values at least one attribute of the tuples identified through the index.

28. The method of claim 27 wherein the attribute is selected from the group consisting of the number of times the tuple was accessed, a rating of the text document of the tuple by users, and the source of the text document of the tuple.

29. The method of claim 26 wherein the relevance values are variables accepting a value from a predetermined range of values.

30. The method of claim 26 wherein the step of assigning relevance values to tuples identified through the index from a query, derives the relevance values from the set of arguments consisting of: attribute values associated with value-matching query elements of the search, previous searches by a user generating the query; degree of consanguinity between the query entered by the user and related query elements automatically augmenting the query; a user entered value; and a total relevance of the query based on a standardized tuple.

31. The method of claim 26 wherein the preprocessor assigns relevance values to at least some tuples identified through the index by means of an absolute relevance value associated with the converted value-matching condition.

32. The method of claim 31 wherein the absolute relevance value contributes to the relevance of the tuples identified by the converted value-matching query elements by adding to the relevance value of common tuples identified by other query elements.

33. The method of claim 26 wherein the assigned relevance is a multiplier that contributes to the relevance of the tuples identified using the index with that query by multiplying the relevance of the identified tuples by the relevance multiplier.

34. A method of searching a logical data table of tuples having attributes where at least one attribute is a text document comprising the steps of:
  (a) receiving a query being a Boolean combination of elements including at least one value-matching query elements for a non-text document attributes and at least one keyword-inclusion query element for the text document attribute;
  (b) searching the logical data table to provide component search results responsive to each query element of the query;
  (c) assigning a relevance value to the component search results for both the query elements that are value-matching query elements and the query elements that are text-inclusion query elements; and
  (d) combining the relevance of all component search results to provide relevance value to search results meeting the query.

35. The method of claim 34 wherein the relevance values are derived from values at least one attribute of the tuples of the component search results.

36. The method of claim 34 wherein the attribute is selected from the group consisting of the number of times the tuple was accessed, a rating of the text document of the tuple by users, and the source of the text document of the tuple.

37. The method of claim 34 wherein the relevance values are variables accepting a value from a predetermined range of values.

38. The method of claim 34 wherein the step of assigning a relevance value to the component search results assigns an absolute relevance value to all tuples associated with the query element.

39. The method of claim 36 wherein the step of assigning a relevance value to the component search results associates a relevance multiplier with the query element.

40. The method of claim 39 wherein the relevance multipliers are derived from the set of arguments consisting of: attribute values associated with value-matching query elements, previous searches by a user generating a current search; degree of consanguinity between the query entered by the user and related query elements automatically augmenting the query; a user entered value; and a total relevance of the query based on a standardized tuple.

41. A method of searching a logical data table of tuples having attributes where at least one attribute is a text document comprising the steps of:
  (a) receiving a query being a Boolean combination of elements including at least one value-matching query element for a non-text document attribute and at least one keyword-inclusion query element for the text document attribute;
  (b) converting the elements of value-matching query elements to elements of keyword-inclusion query elements while preserving associative and commutative properties to the Boolean combination; and
  (c) providing component search results responsive to the converted Boolean combination.

42. The method of claim 41 including further including the step of manipulating the Boolean combination after the conversion of elements to optimize the search.

43. The method of claim 41 including the steps of
  (i) converting the value-matching condition to a keyword-inclusion condition using a pseudo-keyword; and
  (ii) producing search component results using a reverse index of keywords and pseudo-keywords to tuples.

44. The method of claim 43 including the step of assigning relevance values to tuples identified through the index using the converted value-matching query elements as index inputs; and
  wherein the relevance values are derived from the set of arguments consisting of: attribute values associated with value-matching query elements, previous searches by a user generating a current search; degree of consanguinity between the query entered by the user and related query elements automatically augmenting the query; a user entered value; and a total relevance of the query based on a standardized tuple.

45. The method of claim 44 wherein the relevance values are derived from values at least one attribute of the tuples of the component search results.

46. The method of claim 45 wherein the attribute is selected from the group consisting of the number of times the tuple was accessed, a rating of the text document of the tuple by users, and the source of the text document of the tuple.

47. The unified database/text retrieval system of claim 44 wherein the relevance values are variables accepting a value from a predetermined range of values.

* * * * *